(12) United States Patent
Watari (10) Patent No.: US 7,903,097 B2
(45) Date of Patent: Mar. 8, 2011

(54) COORDINATE POSITION DETECTING APPARATUS AND CONTROL METHOD THEREOF

(75) Inventor: Haruo Watari, Tokyo (JP)

(73) Assignee: Pioneer Corporation, Tokyo (JP)

( * ) Notice: Subject to any disclaimer, the term of this patent is extended or adjusted under 35 U.S.C. 154(b) by 964 days.

(21) Appl. No.: 11/510,653

(22) Filed: Aug. 28, 2006

(65) Prior Publication Data

US 2007/0052693 A1    Mar. 8, 2007

(30) Foreign Application Priority Data

Aug. 29, 2005 (JP) ................ P2005-247940

(51) Int. Cl.
*G06F 3/041* (2006.01)
*G06F 3/042* (2006.01)
(52) U.S. Cl. .................................. 345/175; 345/173
(58) Field of Classification Search ........................ None
See application file for complete search history.

(56) References Cited

U.S. PATENT DOCUMENTS

| | | | |
|---|---|---|---|
| 6,730,863 B1 * | 5/2004 | Gerpheide et al. ......... | 178/18.02 |
| 2002/0067348 A1 * | 6/2002 | Masters et al. ............... | 345/175 |
| 2002/0180691 A1 * | 12/2002 | Wong et al. .................. | 345/156 |

FOREIGN PATENT DOCUMENTS

| | | | |
|---|---|---|---|
| JP | 2000-010721 A | | 1/2000 |
| JP | 2000020227 A | * | 1/2000 |
| JP | 2001-306241 A | | 11/2001 |
| JP | 2003-515837 A | | 5/2003 |
| JP | 2004-102896 A | | 4/2004 |

OTHER PUBLICATIONS

Notification of Reasons for Rejection dated May 11, 2010, issued in counterpart Japanese Application No. 2005-247940.

* cited by examiner

*Primary Examiner* — Bipin Shalwala
*Assistant Examiner* — Daniel Bedell
(74) *Attorney, Agent, or Firm* — Sughrue Mion, PLLC (57) ABSTRACT

A coordinate position detecting apparatus includes: a scanning unit that scans a predetermined scanning area in predetermined scanning precision along a horizontal direction and a vertical direction with respect to a display screen by employing detection beams respectively. A position of a light shielding article on the display screen is detected in correspondence with scanning positions of the detection beams which are light-shielded. The scanning unit includes: a drive control unit that switches a plurality of scanning modes having different scanning accuracies from each other; and a moving speed detecting unit that detects a moving speed of the light shielding article. The scanning unit selects a predetermined scanning mode from the plurality of scanning modes in response to the scanning speed detected by the moving speed detecting unit to perform a scanning operation.

7 Claims, 7 Drawing Sheets

COORDINATE POSITION DETECTING APPARATUS AND CONTROL METHOD THEREOF

The present disclosure relates to the subject matter contained in Japanese Patent Application No. 2005-247940 filed on Aug. 29, 2005, which is incorporated herein by reference in its entirety.

BACKGROUND OF THE INVENTION

1. Field of the Invention

The present invention relates to a coordinate position detecting apparatus, and a control method and program thereof.

2. Background Art

An example of a coordinate position detecting apparatus for an optical type touch panel or the like is an apparatus using a coordinate position detecting method disclosed in, for instance, JP-A-2001-306241.

This coordinate position detecting apparatus detects the position on the coordinates on the display screen of a display apparatus, such as a plasma display panel or a cathode-ray tube, which is touched with a finger, a pen or the like. The coordinate position detecting apparatus scans the two-dimensional display screen in the horizontal direction (X axis direction) and the vertical direction (Y axis direction) perpendicular to each other, with detection beams; respectively, and detects a position of a light shielding article touched on the display screen in correspondence to a scanning position of a light-shielded detection beam.

Figure 1:
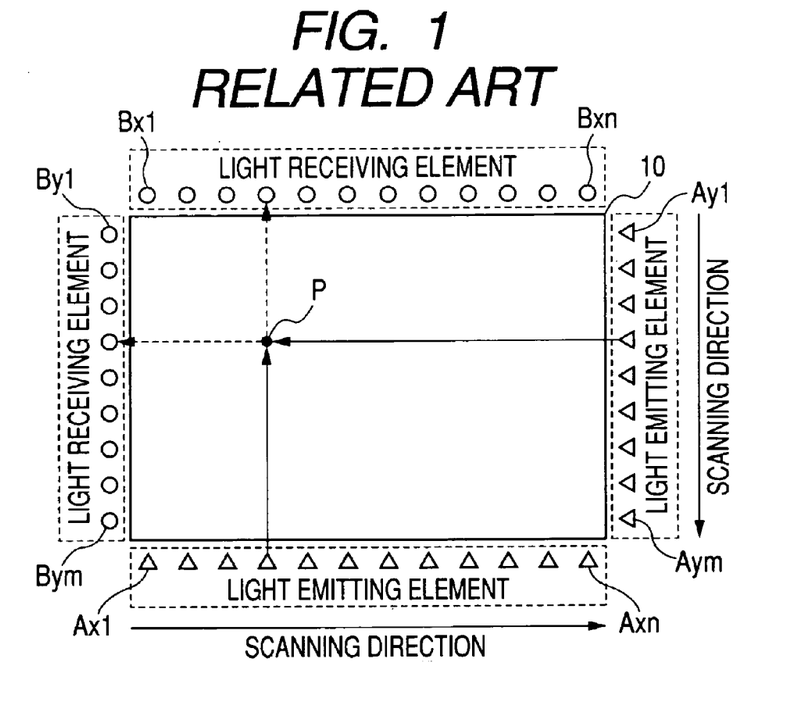
FIG. 1 is a diagram for explaining the conventional coordinate position detecting method.

FIG. 1 is a diagram for explaining a conventional coordinate position detecting method. A plurality of light emitting elements Ax1 to Axn and Ay1 to Aym are respectively arrayed on one lateral side (X axis direction) and one longitudinal side (Y axis direction) of a display screen 10, and a plurality of light receiving elements Bx1 to Bxn and By1 to Bym are respectively arrayed on the other lateral side and longitudinal side opposite to the light emitting elements.

A scanning operation with detection beams mentioned in this specification is to sequentially turn ON a plurality of light emitting elements Ax1 to Axn and Ay1 to Aym in this order, and receive the detection beams at the opposing light receiving elements. When an arbitrary point P on the display screen 10 is touched with a finger, a pen or so, detection beams emitted from corresponding light emitting elements on the lateral side and the longitudinal side are shielded, and are not received by the opposing light receiving elements, respectively. Accordingly, the touched position is specified by detecting the X-axis and Y-axis coordinate positions of the touched position from the layout positions of those light receiving elements on the lateral side and longitudinal side which have not received the beams.

Data of the coordinate positions detected by the coordinate position detecting method are connected by lines based upon application software installed on a personal computer or the like, and are drawn on the display screen. In the scanning operation with the detection beams, as shown in FIG. 2, the light emitting elements correspond one to one to the light receiving elements, and the loci of the detection beams have a grid pattern.

Figure 2:
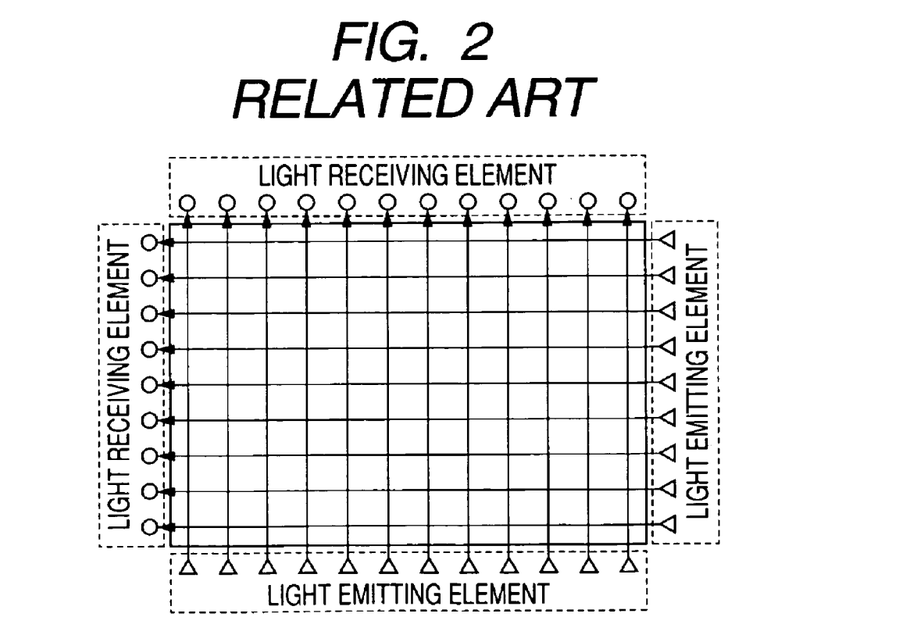
FIG. 2 is a diagram for explaining the loci of detection beams according to the conventional coordinate position detecting method.

As a consequence, the coordinate position detecting method that provides grid-shaped loci of detection beams as shown in FIG. 2 cannot acquire coordinate positional information with finer pitches than the layout pitches (arranging intervals) of the light emitting elements and the light receiving elements. If the numbers of the light emitting elements and the light receiving elements are increased so as to make the layout pitches narrower in order to acquire coordinate position information with finer pitches, a large number of elements are required, so that manufacturing cost is increased. Further, the layout pitches are limited to the sizes of the elements (light emitting elements and light receiving elements).

As the conventional coordinate position detecting method cannot acquire coordinate positional information with finer pitches, it is difficult to accurately trace and draw the locus of a finger or a pen touching the display screen.

While the coordinate position detecting method described in JP-A-2001-306241 performs the scanning operation in the limited area, the position of a finger, a pen or so moves out of the scanning range when the moving speed of the finger or the pen is fast, which may result in discontinuous draw lines to be drawn on the display screen.

SUMMARY OF THE INVENTION

It is one of the objects of the invention to ensure acquisition of coordinate positional information with finer pitches than the layout pitches of the light emitting elements and the light receiving elements, and to ensure detection of the position of a finger, a pen or the like even when the finger, the pen or the like moves at a high speed, by way of example each.

The invention provides a coordinate position detecting apparatus, including: a scanning unit that scans a predetermined scanning area in predetermined scanning precision along a horizontal direction and a vertical direction with respect to a display screen by employing detection beams respectively; wherein a position of a light shielding article on the display screen is detected in correspondence with scanning positions of the detection beams which are light-shielded; the scanning unit includes: a drive control unit that switches a plurality of scanning modes having different scanning accuracies from each other; and a moving speed detecting unit that detects a moving speed of the light shielding article; and the scanning unit selects a predetermined scanning mode from the plurality of scanning modes in response to the scanning speed detected by the moving speed detecting unit to perform a scanning operation.

The invention may provide a control method of a coordinate position detecting apparatus, wherein the coordinate position detecting apparatus scans a predetermined scanning area in a predetermined scanning accuracy along a horizontal direction and a vertical direction with respect to a display screen by employing detection beams respectively, and detects a position of a light shielding article on the display screen in correspondence with scanning positions of the detection beams which are light-shielded, the control method including: performing a scanning in a first scanning mode until the light shielding article is detected; and performing a scanning in a plurality of scanning mode that are different from the first scanning mode and that is selected in response to a moving speed of the light shielding article.

The invention may provide a program product for enabling a computer to control a coordinate position detecting apparatus, wherein the coordinate position detecting apparatus scans a predetermined scanning area in a predetermined scanning accuracy along a horizontal direction and a vertical direction with respect to a display screen by employing detection beams respectively, and detects a position of a light shielding article on the display screen in correspondence with scanning positions of the detection beams which are light-shielded, the program product including: software instructions for enabling the computer to instruct the coordinate position detecting apparatus to perform predetermined operations; and a computer readable medium bearing the software instructions; wherein the predetermined operations includes: performing a scanning in a first scanning mode until the light shielding article is detected; and performing a scanning in a plurality of scanning mode that are different from the first scanning mode and that is selected in response to a moving speed of the light shielding article.

BRIEF DESCRIPTION OF THE DRAWINGS

The present invention may be more readily described with reference to the accompanying drawings.

DETAILED DESCRIPTION OF THE PREFERRED EMBODIMENTS

Figure 3:
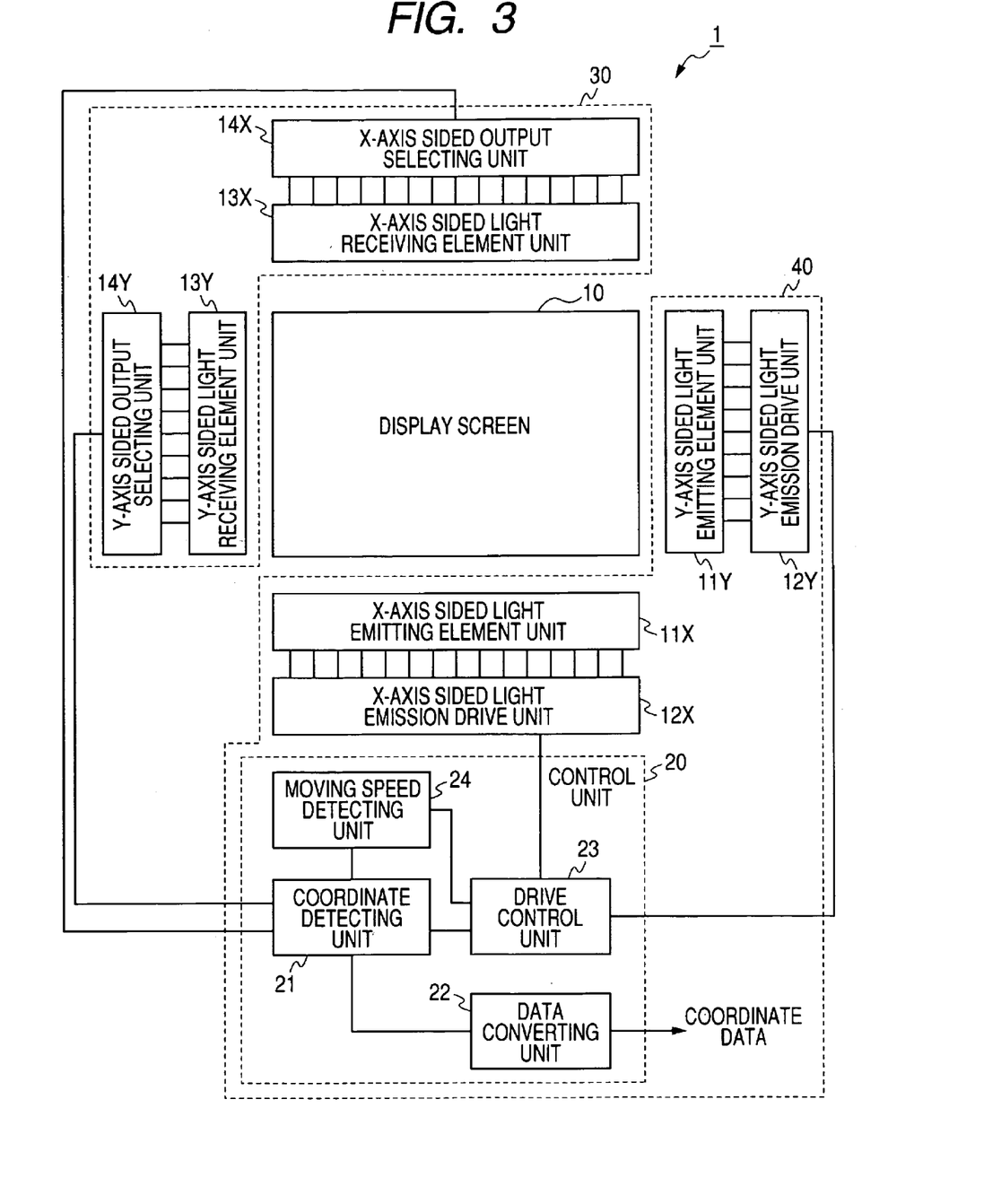
FIG. 3 is a structural diagram of a coordinate position detecting apparatus according to an embodiment of the invention.

A coordinate position detecting apparatus and a control method thereof according to embodiments of the present invention will now be described in detail with reference to drawings. It should be noted that the same reference symbols are used in the diagrams to denote those components which have the same functions. FIG. 3 is a structural diagram of a coordinate position detecting apparatus 1 according to one embodiment of the invention. FIGS. 4 to 8 are diagrams for explaining operations of a coordinate position detecting method according to the embodiment of the invention.

As shown in FIG. 3, the coordinate position detecting apparatus 1 according to the embodiment of the invention is equipped with a scanning unit 40 (scanning means) which scans a display screen 10 in a horizontal direction (X axis direction) and a vertical direction (Y axis direction) with detection beams in predetermined scanning modes, respectively. The coordinate position detecting apparatus 1 constitutes such a coordinate position detecting apparatus which detects a position of a light shielding article on the display screen 10 in correspondence to the scanning position of a light-shielded detection beam.

The scanning unit 40 is equipped with an X-axis sided light emitting element unit 11X, a Y-axis sided light emitting element unit 11Y, an X-axis sided light emission drive unit 12X, a Y-axis sided light emission drive unit 12Y, and a control unit 20. The X-axis sided light emitting element unit 11X has "n" pieces of light emitting elements (Ax1 to Axn) arrayed in the X axis direction of the display screen 10 in correspondence to the horizontal width thereof. The Y-axis sided light emitting element unit 11Y has "m" pieces of light emitting elements (Ay1 to Aym) arrayed in the Y axis direction of the display screen 10 in correspondence to the vertical width thereof. The X-axis sided light emission drive unit 12X turns ON the X-axis sided light emitting element unit 11X. The Y-axis sided light emission drive unit 12Y turns ON the Y-axis sided light emitting element unit 11Y. The control unit 20 sends control signals to the X-axis sided light emission drive unit 12X and the Y-axis sided light emission drive unit 12Y.

The photo sensing unit 30 contains an X-axis sided light receiving element unit 13X, a Y-axis sided light receiving element unit 13Y, an X-axis sided output selecting unit 14X, and a Y-axis sided output selecting unit 14Y. The X-axis sided light receiving element unit 13X has "n" pieces of light receiving elements (Bx1 to Bxn) arrayed along one side of the display screen 10 and opposite to the X-axis sided light emitting element unit 11X arrayed along one side of the display screen 10. The Y-axis sided light receiving element unit 13Y has "m" pieces of light receiving elements (By1 to Bym) arrayed along one side of the display screen 10 and opposite to the Y-axis sided light emitting element unit 11Y arrayed along one side of the display screen 10. The X-axis sided output selecting unit 14X and the Y-axis sided output selecting unit 14Y respectively send signals output from the X-axis sided light receiving element unit 13X and the Y-axis sided light receiving element unit 13Y to the control unit 20.

The control unit 20 also contains a coordinate detecting unit 21, a data converting unit 22, a drive control unit 23, and a moving speed detecting unit 24. The coordinate detecting unit 21 detects coordinates based on the signals from the X-axis sided output selecting unit 14X and the Y-axis sided output selecting unit 14Y. The data converting unit 22 converts a detected coordinate position to coordinate data. The drive control unit 23 sets the turn-ON order of the X-axis sided light emitting element unit 11X and the Y-axis sided light emitting element unit 11y, and changes over a scanning mode to be described later. The moving speed detecting unit 24 detects a moving speed of the light shielding article on the display screen 10.

Figure 4:
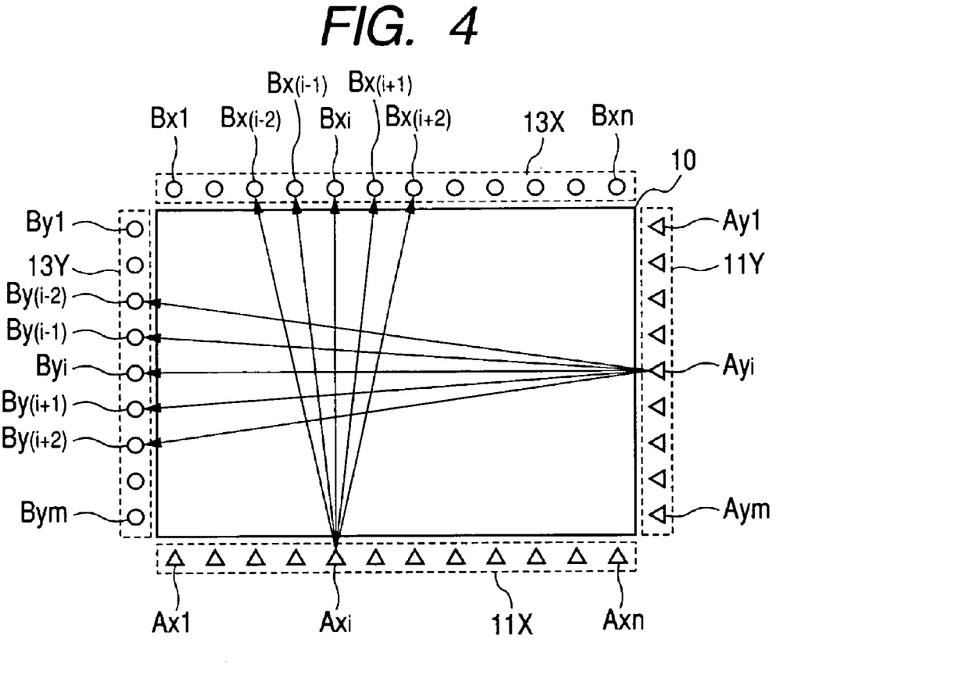
FIG. 4 is a diagram for explaining operations of a coordinate position detecting method according to an embodiment of the invention.

Referring now to FIG. 4, a description will now be made of the basic operation of "oblique scanning", one feature of the coordinate position detecting method of the embodiment, which receives a detection beam, emitted from a light emitting element, at a plurality of light receiving elements located opposite to positions including oblique directional positions of the light emitting element so as to detect the position of the light shielding article.

The light emitting elements Ax1 to Axn of the X-axis sided light emitting element unit 11X and the light emitting elements Ay1 to Aym of the Y-axis sided light emitting element unit 11Y sequentially emit detection beams toward the X-axis sided light receiving element unit 13X and the Y-axis sided light receiving element unit 13Y directed to the respective light emitting elements. FIG. 4 shows a state in which the light emitting element Axi of the X-axis sided light emitting element unit 11X and the light emitting element Ayi of the Y-axis sided light emitting element unit 11Y are turned ON.

As the detection beam emitted from the light emitting element Axi of the X-axis sided light emitting element unit 11X has a predetermined spread, the detection beam can be received by a plurality of light receiving elements of the X-axis sided light receiving element unit 13X, for example, Bx(i−2), Bx(i−1), Bxi, Bx(i+1) and Bx(i+2). When the light emitting element Axi is turned ON, the detection beam therefrom is detected by the light receiving elements Bx(i−2), Bx(i−1), Bxi, Bx(i+1), Bx(i+2).

Similarly, as the detection beam emitted from the light emitting element Ayi of the Y-axis sided light emitting element unit 11Y has a predetermined spread, the detection beam can be received by a plurality of light receiving elements of the Y-axis sided light receiving element unit 13Y, for example, By(i−2), By(i−1), Byi, By(i+1) and By(i+2). When the light emitting element Ayi is turned ON, the detection beam therefrom is detected by the light receiving elements By(i−2), By(i−1), Byi, By(i+1), By(i+2).

Figure 5:
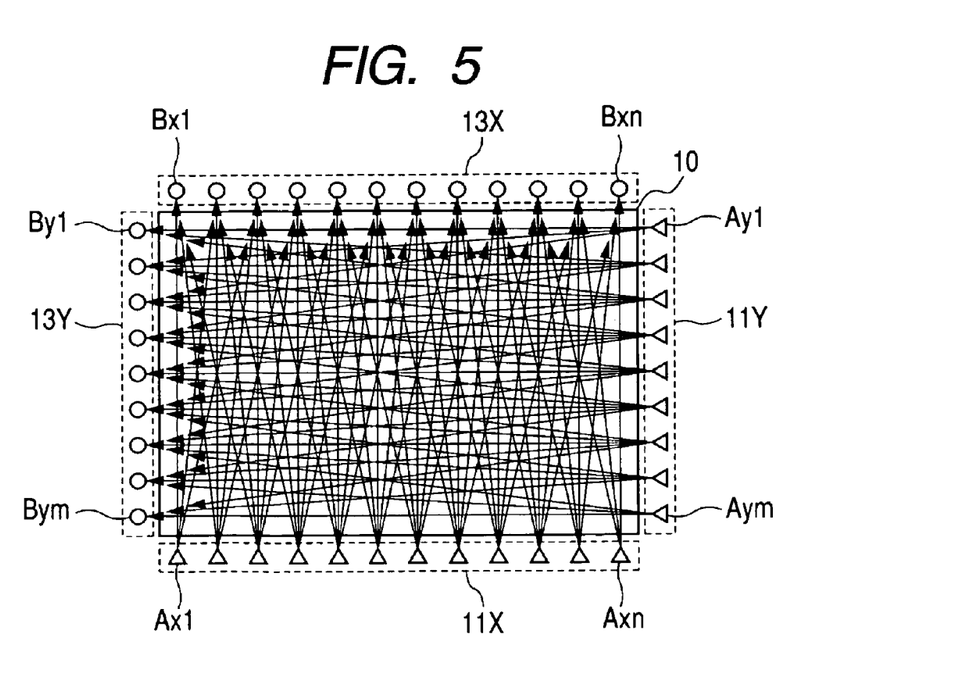
FIG. 5 is a diagram for explaining the operations of the coordinate position detecting method according to the embodiment of the invention.

All the light emitting elements Ax1 to Axn and Ay1 to Aym are sequentially turned ON to carry out oblique scanning. FIG. 5 shows the loci of the detection beams from all the light emitting elements Ax1 to Axn and Ay1 to Aym. Such a scanning operation allows the coordinate position of a light shielding article on the display screen 10 to be detected based on the positions of the loci of the light-shielded detection beams.

The oblique scanning as shown in FIG. 5 provides denser loci of detection beams, as compared with such a case that the grid-shaped scanning as shown in FIG. 2 is executed, and can provide coordinate position information with narrower pitches than the layout pitches of the light emitting elements and the light receiving elements.

It should also be noted that five light receiving elements can receive a detection beam from a single turned-ON light emitting element in the embodiment. However, any number of light receiving elements may be alternatively enabled to detect a detection beam from a single turned-ON light emitting element, although a total number is restricted by the spread characteristics of the detection beams of the light emitting elements and the characteristic of the detection sensitivity of the light receiving elements.

In the coordinate position detecting apparatus 1 of the embodiment, the scanning unit 40 is operated in any one of a first scanning mode, a second scanning mode, and a third scanning mode.

In the first scanning mode, a grid-shaped scanning operation is performed over the entire display screen 10 in a similar scanning operation in the related art shown in FIG. 2. The grid-shaped scanning operation is carried out as the light emitting elements Ax1 to Axn of the X-axis sided light emitting element unit 11X and the light emitting elements Ay1 to Aym of the Y-axis sided light emitting element unit 11Y, which are arrayed in correspondence to the horizontal width and vertical width of the display screen 10, are sequentially turned ON. This first scanning mode is used in initially detecting a light shielding article.

In the second scanning mode, an oblique scanning operation is performed. In the second scanning mode, a scan area is limited to a range including coordinate positions detected in the first scanning mode but narrower than the full area of the full scanning operation, and the scanning operation is performed within the range as, for example, the light emitting elements Ax(i−2), Ax(i−1), Axi, Ax(i+1), Ax(i+2) of the x-axis sided light emitting element unit 11X and the light emitting elements Ay(i−2), Ay(i−1), Ayi, Ay(i+1), Ay(i+2) of the Y-axis sided light emitting element unit 11Y are sequentially turned ON as shown in FIG. 6.

In the second scanning mode, a maximum of five light receiving elements sequentially detect a detection beam emitted from a single light emitting element.

Figure 6:
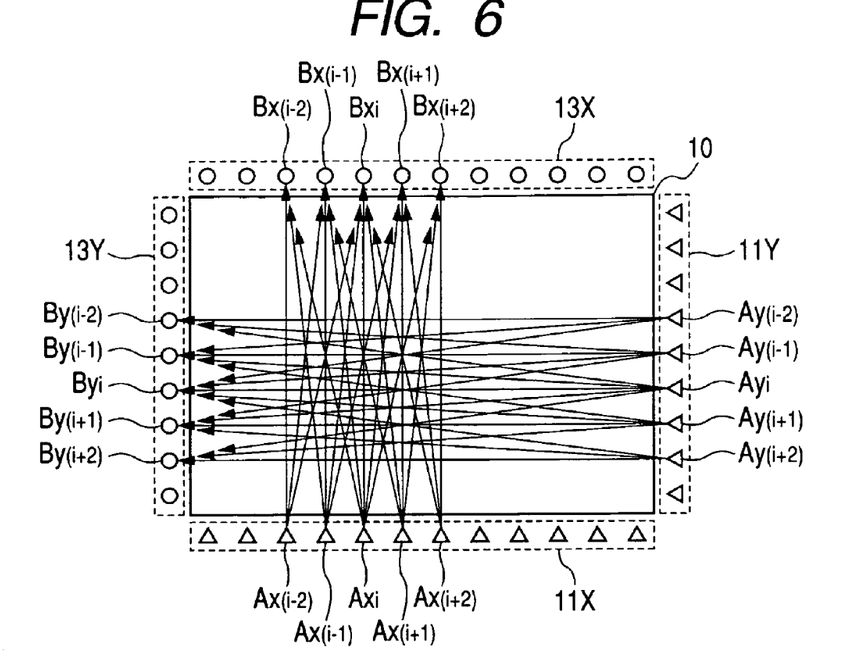
FIG. 6 is a diagram for explaining the operations of the coordinate position detecting method according to the embodiment of the invention.

That is to say, in an example shown in FIG. 6, first, the light emitting element Ax(i−2) of the X-axis sided light emitting element unit 11X is turned ON, and a detecting operation of a detection beam by the light receiving elements Bx (i−2), Bx(i−1), Bxi is sequentially executed. Next, the light emitting element Ax(i−1) is turned ON, and a detecting operation of a detection beam by the light receiving elements Bx(i−2), Bx(i−1), Bxi, Bx(i+1) is sequentially executed. Then, the light emitting element Axi is turned ON, and a detecting operation of a detection beam by the light receiving elements Bx(i−2), Bx(i−1), Bxi, Bx(i+1), Bx(i+2) is sequentially executed. Then, the light emitting element Ax(i+1) is turned ON, and a detecting operation of a detection beam by the light receiving elements Bx(i−1), Bxi, Bx(i+1), Bx(i+2) is sequentially executed. Finally, the light emitting element Ax(i+2) is turned ON, and a detecting operation of a detection beam by the light receiving elements Bxi, Bx(i+1), Bx(i+2) is sequentially executed.

Similarly, the light emitting element Ay(i−2) of the Y-axis sided light emitting element unit 11Y is turned ON, and a detecting operation of a detection beam by the light receiving elements By(i−2), By(i−1), Byi is sequentially executed. Next, the light emitting element Ay(i−1) is turned ON, and a detecting operation of a detection beam by the light receiving elements By(i−2), By(i−1), Byi, By(i+1) is sequentially executed. Then, the light emitting element Ayi is turned ON, and a detecting operation of a detection beam by the light receiving elements By(i−2), By(i−1), Byi, By(i+1), By(i+2) is sequentially executed. Then, the light emitting element Ay(i+1) is turned ON, and a detecting operation of a detection beam by the light receiving elements By(i−1), Byi, By(i+1), By(i+2) is sequentially executed. Finally, the light emitting element Ay(i+2) is turned ON, and a detecting operation of a detection beam by the light receiving elements Byi, By(i+1), By(i+2) is sequentially executed.

Figure 7:
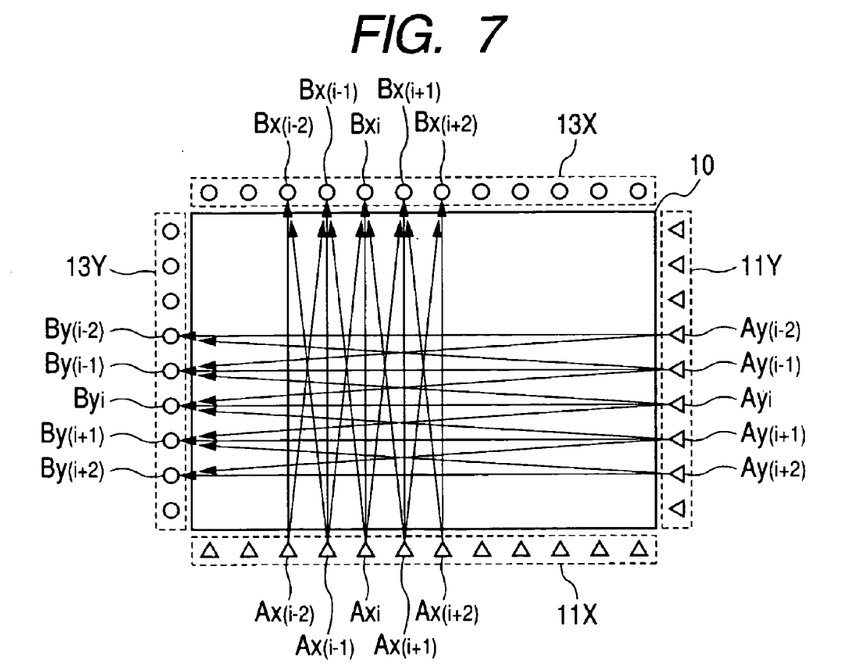
FIG. 7 is a diagram for explaining the operations of the coordinate position detecting method according to the embodiment of the invention.

In the third scanning mode, similar to the second scanning mode, an oblique scanning operation is performed. In the third scanning mode, a scan area is limited to a range including coordinate positions detected in the first scanning mode but narrower than the full area of the full scanning operation, and a scanning operation is performed within the range as, for example, the light emitting elements Ax(i−2), Ax(i−1), Axi, Ax(i+1), Ax(i+2) of the X-axis sided light emitting element unit 11X and the light emitting elements Ay(i−2), Ay(i−1), Ayi, Ay(i+1), Ay(i+2) of the Y-axis sided light emitting element unit 11Y are sequentially turned ON, as shown in FIG. 7.

In the third scanning mode, a maximum of three light receiving elements sequentially detect a detection beam emitted from a single light emitting element. That is, the third scanning mode is featured in that a total number of light receiving elements which receive a detection beam emitted from a single light emitting element is less than that in the second scanning mode.

That is to say, in an shown in FIG. 6, first, the light emitting element Ax(i−2) of the X-axis sided light emitting element unit 11X is turned ON, and a detecting operation of a detection beam by the light receiving elements Bx(i−2), Bx(i−1) is sequentially executed. Next, the light emitting element Ax(i−1) is turned ON, and a detecting operation of a detection beam by the light receiving elements Bx(i−2), Bx(i−1), Bxi is sequentially executed. Then, the light emitting element Axi is turned ON, and a detecting operation of a detection beam by the light receiving elements Bx(i−1), Bxi, Bx(i+1) is sequentially executed. Then, the light emitting element Ax(i+1) is turned ON, and a detecting operation of a detection beam by the light receiving elements Bx(i−1), Bxi, Bx(i+1) is sequentially executed. Finally, the light emitting element Ax(i+2) is turned ON, and a detecting operation of a detection beam by the light receiving elements Bx(i+1), Bx(i+2) is sequentially executed.

Similarly, the light emitting element Ay(i−2) of the Y-axis sided light emitting element unit 11Y is turned ON, and a detecting operation of a detection beam by the light receiving elements By(i−2), By(i−1) is sequentially executed. Next, the light emitting element Ay(i−1) is turned ON, and a detecting operation of a detection beam by the light receiving elements By(i−2), By(i−1), Byi is sequentially executed. Then, the light emitting element Ayi is turned ON, and a detecting operation of a detection beam by the light receiving elements By(i−1), Byi, By(i+1) is sequentially executed. Then, the light emitting element Ay(i+1) is turned ON, and a detecting operation of a detection beam by the light receiving elements Byi, By(i+1), By(i+2) is sequentially executed. Finally, the light emitting element Ay(i+2) is turned ON, and a detecting operation of a detection beam by the light receiving elements By(i+1), By(i+2) is sequentially executed.

In the fourth scanning mode, an oblique scanning operation is performed. In the further scanning mode, a scan area is limited to a range including coordinate positions detected in the first scanning mode but narrower than the full area of the full scanning operation, and a grid-shaped scanning operation is performed within the range as, for example, the light emitting elements Ax(i−2), Ax(i−1), Axi, Ax(i+1), Ax(i+2) of the X-axis sided light emitting element unit 11X and the light emitting elements Ay(i−2), Ay(i−1), Ayi, Ay(i+1), Ay(i+2) of the Y-axis sided light emitting element unit 11Y are sequentially turned ON, as shown in FIG. 8.

Figure 8:
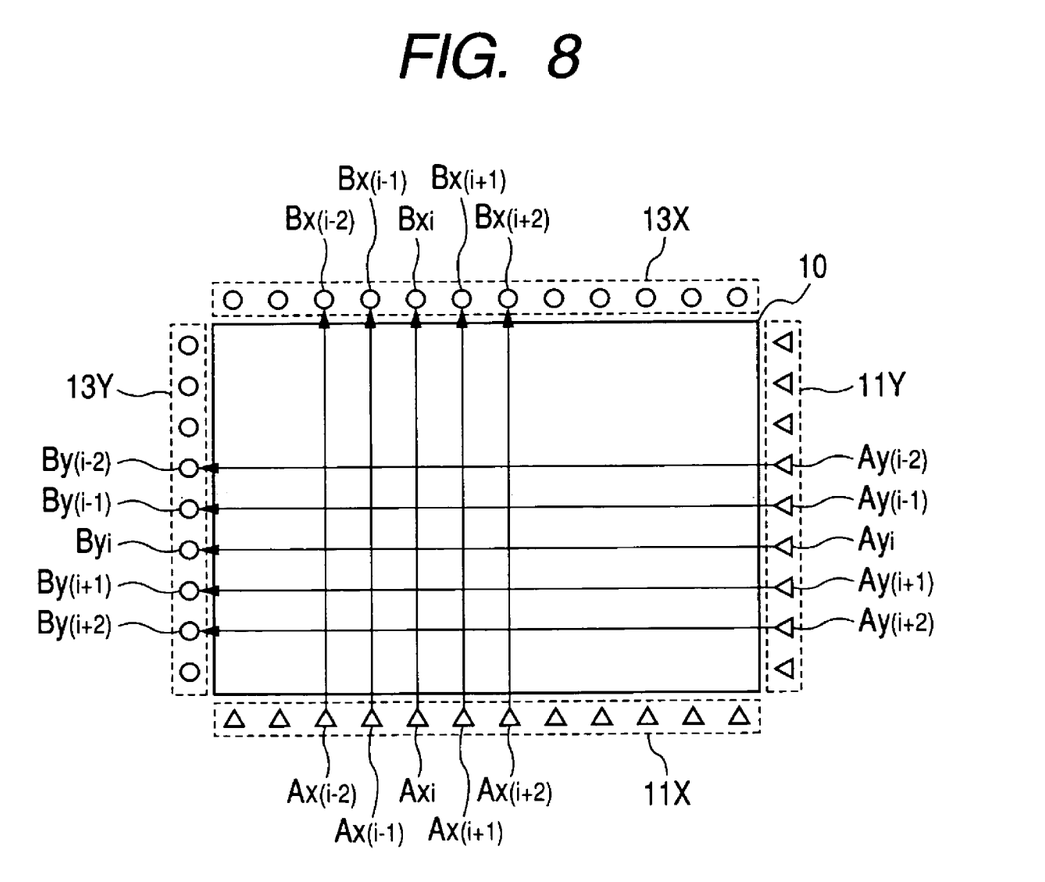
FIG. 8 is a diagram for explaining the operations of the coordinate position detecting method according to the embodiment of the invention.

It should be noted that the widths of the scan area in the second to fourth scanning modes are not limited to the above-described examples in FIGS. 6 to 8, and may be determined adequately. The width of the scan area in the X axis direction may alternatively differ from the width of the scan area in the Y axis direction.

Figure 9:
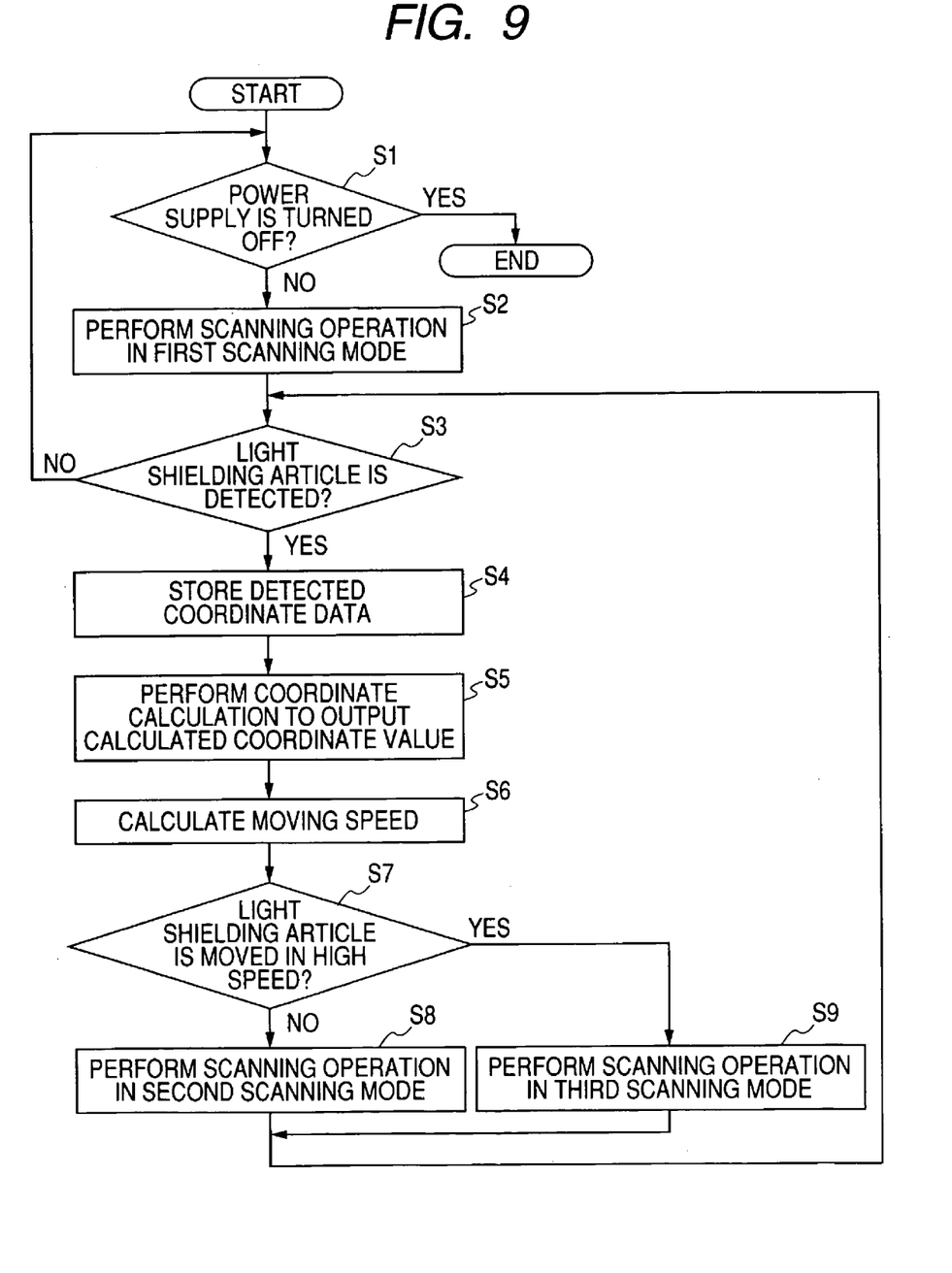
FIG. 9 is a flow chart of a control method for the coordinate position detecting apparatus according to the embodiment of the invention.

The operations of the control method for the coordinate position detecting apparatus 1 according to the embodiment will be described next with reference to FIGS. 3, 6 and 7. The flow in FIG. 9 is one example of the operational flow of the control method for the coordinate position detecting apparatus 1.

First, in a step S1, a judgement is made as to whether the power supply of the coordinate position detecting apparatus 1 has been turned OFF. When the power supply of the coordinate position detecting apparatus 1 is under ON status (step 1: NO), a scanning operation is performed in the first scanning mode (step S2). The scanning operation in the first scanning mode is continuously performed until a light shielding article is detected (in step S3). When a light shielding article is detected (step S3: YES), the output of the coordinate detecting unit 21 is converted by the data converting unit 22, and the detected coordinate data is stored in a memory apparatus (not shown) (step S4). The output coordinates in the display screen 10 are computed based on the detected coordinate data, and the computed coordinates are output (step 5S).

The above-explained detection of a light shielding article is premised on that the light shielding article has been detected consecutively in two or more scanning periods. The moving speed of the light shielding article can be computed from the distance between the detected two coordinate positions, and the detection times.

The moving speed detecting unit 24 computes the moving speed of the light shielding article (step S6). When the moving speed of the light shielding article exceeds a predetermined speed (step S7: YES), it is so determined that the light shielding article is moving at a high speed, so that the drive control unit 23 executes a scanning operation in the third scanning mode suitable for responding to the high-speed movement of the light shielding article (step S9). When the moving speed of the light shielding article is equal to or lower than the predetermined speed (step S7: NO), the drive control unit 23 executes a scanning operation in the second scanning mode by which accurate positional information is acquired (step S8).

When a light shielding article is detected during this new scanning mode, the above-described steps S4 to S7 are executed, and another scanning operation is further carried out in a scanning mode according to the moving speed of the light shielding article. When no light shielding article is detected, the flow operation is returned to the step S1. When the power supply is not turned OFF, the first scanning mode is executed. When the power supply is turned OFF during the operation (step 1: YES), however, the process operation is terminated.

The predetermined moving speed in the step S7 is selected to be, for example, 10 cm/s. That is, when the moving speed of the light shielding article exceeds 10 cm/s, the light shielding article is considered as moving at a high speed, and the scanning operation is performed in the third scanning mode.

According to the above-explained embodiment, when a light shielding article such as a finger or a pen moves at a high speed, the scanning period can be made shorter by reducing the total number of detection beams emitted from a single light emitting element. This ensures a response to the movement of a finger, a pen or the like, thus making it difficult to cause discontinuous drawing lines at the time of drawing a simple figure or an example where a finger, a pen or the like moves at a high speed.

When the light shielding article such as a finger or a pen moves at a low speed, the loci of the detection beams in the scanning operation becomes denser by increasing the total number of detection beams emitted from a single light emitting element. This can provide more accurate coordinate positional information, and enable more accurate drawing of a complex character, figure or the like.

Figure 10:
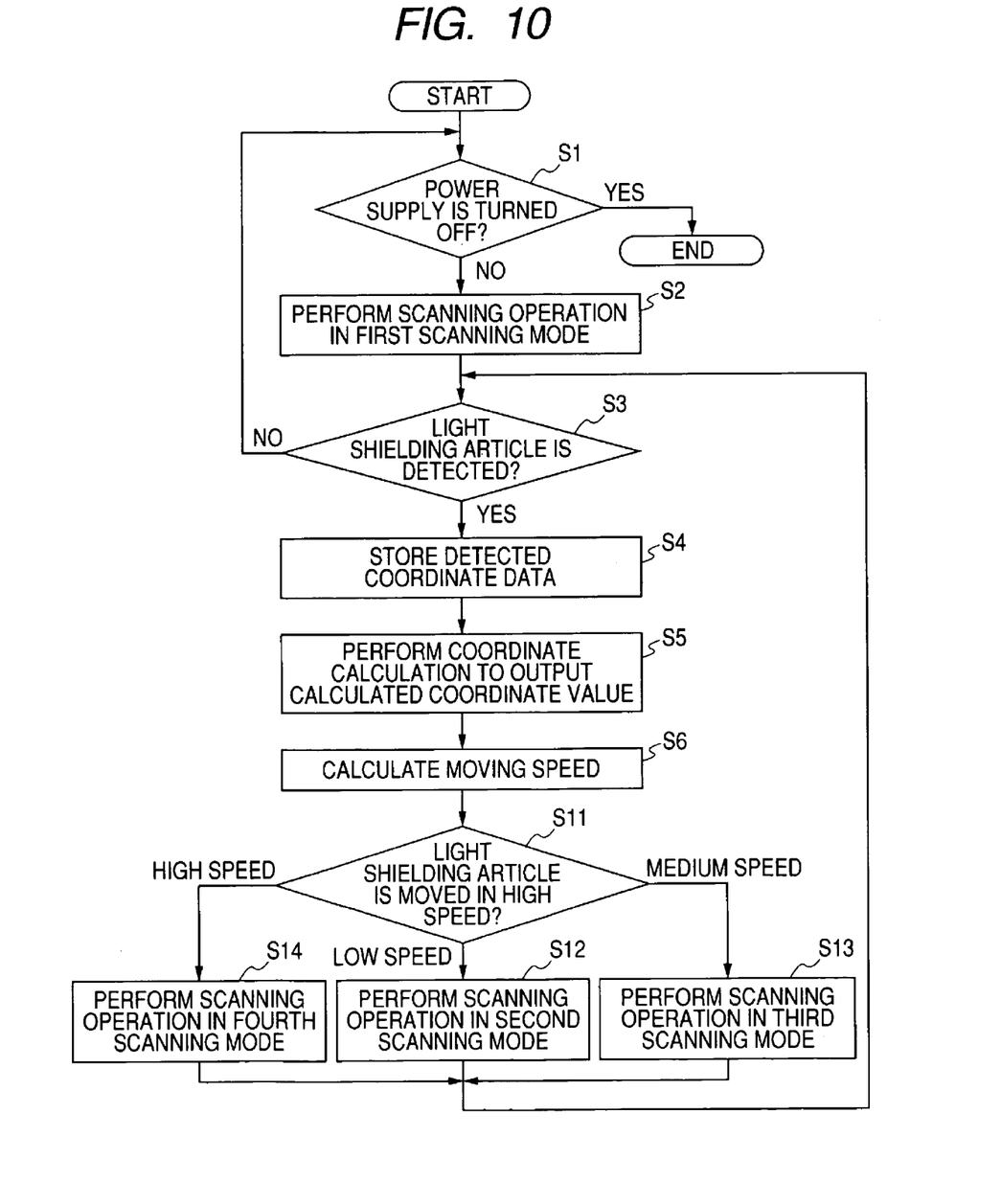
FIG. 10 is another example of the flow chart of the control method for the coordinate position detecting apparatus according to the embodiment of the invention.

The operation of another example of the control method for the coordinate position detecting apparatus 1 according to the embodiment will be described with reference to a flow operation in FIG. 10 and FIGS. 3 and 6 to 8. FIG. 10 shows another example of the flow operation of the control method for the coordinate position detecting apparatus 1. It should also be noted that the same reference symbols are given to the same process operations in FIG. 10 as those illustrated in FIG. 9 to avoid redundant descriptions.

Also, in this example shown in FIG. 10, the operation in the flow chart from step S1 to step S6 is the same as the operation in the flow chart in FIG. 9. In a step S11, the moving speed of a light shielding article is classified into three levels of "low speed", "middle speed" and "high speed", and a scanning operation is performed in a scanning mode suitable for each moving speed. Specifically, in the step 511, the "low speed" is equal to or lower than a first moving speed, the "middle speed" is higher than the first moving speed and equal to or lower than a second moving speed, and the "high speed" is higher than the second moving speed.

When the moving speed corresponds to the "low speed", the light shielding article is determined as moving at a low speed, so that the drive control unit 23 performs a scanning operation in the second scanning mode suitable for the low speed (step S12). When the moving speed corresponds to the "middle speed", the light shielding article is determined as moving at a middle speed, so that the drive control unit 23 performs a scanning operation in the third scanning mode suitable for the middle speed (step S13). When the moving speed corresponds to the "high speed", the light shielding article is determined as moving at a high speed, so that the drive control unit 23 performs a scanning operation in the fourth scanning mode suitable for the high speed (step S14).

When a light shielding article is detected during this new scanning mode, the steps S4 to S11 are executed, and a scanning operation is further carried out in a scanning mode according to the moving speed of the light shielding article. When no light shielding article is detected, the flow operation is returned to the step S1. When the power supply is not turned OFF, the first scanning mode is executed. When the power supply is turned OFF during the operation (step S1: YES), however, the process operation is terminated.

The first moving speed and the second moving speed which are used in the decision in the step S11 are set in such a way that the first moving speed is 10 cm/s and the second moving speed is 50 cm/s.

When the moving speed of the light shielding article is equal to or lower than 10 cm/s, the moving speed is determined as the "low speed", and a scanning operation is performed in the second scanning mode. When the moving speed of the light shielding article is higher than 10 cm/s and equal to or lower than 50 cm/s, the moving speed is determined as the "middle speed", and a scanning operation is performed in the third scanning mode. When the moving speed of the light shielding article is higher than 50 cm/s, the moving speed is determined as the "high speed", and a scanning operation is performed in the fourth scanning mode.

According to this embodiment in FIG. 10, the moving speeds of the light shielding article are classified into three sorts of "low speed", "middle speed" and "high speed", so that a scanning mode suitable for each moving speed can be selected. For various moving speeds, therefore, it is possible to secure the response characteristics to the movement a finger, a pen or so, and the precision of the coordinate position thereof.

The numbers of light receiving elements which detect a detection beam emitted from a single light emitting element in the second scanning mode and the third scanning mode are not limited to those of the example in FIG. 9 or FIG. 10.

The types of the moving speeds are not limited to two in the example in FIG. 9 or three in the example in FIG. 10, but may be changed to four or more types according to the moving speed of, for example, a finger, a pen or so.

As described in detail above, the coordinate position detecting apparatus 1 according to the embodiment of the invention corresponds to such a coordinate position detecting apparatus which is equipped with the scanning unit 40 (scanning means) which scans the display screen 10 within the predetermined scanning area in the horizontal direction and the vertical direction in the predetermined scanning precision with the detection beams respectively, and detects the position of the light shielding article on the display screen 10 in correspondence to the scanning position of the light-shielded detection beam. The scanning unit 40 is provided with the drive control unit 23 which changes over the plurality of scanning modes of different scanning precision from one to another, and the moving speed detecting unit 24 which detects the moving speed of the light shielding article. The scanning unit 40 of the coordinate position detecting apparatus 1 performs the scanning operation with a predetermined scanning mode selected from the plurality of scanning modes in response to the moving speed of the light shielding article detected by the moving speed detecting unit 24.

As a consequence, the coordinate position detecting apparatus 1 can acquire the coordinate positional information with the finer pitches than the arranging intervals of the light emitting elements and the light receiving elements, and can detect the position of a light shielding article such as a finger or a pen even when the light shielding article moves at the high speed on the display screen 10.

The control method for the coordinate position detecting apparatus 1 according to the embodiment of the invention corresponds to such a method for controlling the coordinate position detecting apparatus 1 which scans the display screen 10 within the predetermined scanning area in the horizontal direction and the vertical direction in the predetermined scanning precision with the detection beams respectively, and detects the position of the light shielding article on the display screen 10 in correspondence to the scanning position of the light-shielded detection beam. The scanning operation is performed in the first scanning mode until the light shielding article is detected, and the scanning operation is performed after the plurality of scanning modes different from the first scanning mode are selected in response to the moving speed of the light shielding article.

As a consequence, the control method for the coordinate position detecting apparatus can acquire the coordinate positional information with the finer pitches than the layout pitches of the light emitting elements and the light receiving elements, and can detect the position of the light shielding article such as the finger or the pen even when the light shielding article moves at a high speed.

What is claimed is:

1. A coordinate position detecting apparatus, comprising:
    a scanning unit that scans a predetermined scanning area in predetermined scanning precision along a horizontal direction and a vertical direction with respect to a display screen by employing detection beams respectively;
    wherein a position of a light shielding article on the display screen is detected in correspondence with scanning positions of the detection beams which are light-shielded;
    wherein the scanning unit includes:
        a drive control unit that switches a plurality of scanning modes having different scanning accuracies from each other; and
        a moving speed detecting unit that detects a moving speed of the light shielding article; and
    wherein the plurality of the scanning modes include:
    a first scanning mode for performing a grid-shaped scanning operation over an entire scanning area on the display screen;
    a second scanning mode for performing an oblique scanning operation while limiting a scanning area to a narrower range than the entire scanning area, the narrower range containing a coordinate position detected in the first scanning mode; and
    a third scanning mode for performing the oblique scanning operation under which a total number of the light receiving elements for detecting the detection beam emitted from a single light emitting element is smaller than that of the second scanning mode, while limiting a scanning area to a narrower range than the entire scanning area, the narrower range containing a coordinate position detected in the first scanning mode.

2. The coordinate position detecting apparatus as claimed in claim 1,
    wherein the plurality of scanning modes further includes a fourth scanning mode for limiting a scanning area to a narrower range than the entire scanning area, the narrower range containing the coordinate position detected in the first scanning mode so as to perform the grid-shaped scanning operation within the limited scanning area.

3. A control method of a coordinate position detecting apparatus, wherein the coordinate position detecting apparatus scans a predetermined scanning area in a predetermined scanning accuracy along a horizontal direction and a vertical direction with respect to a display screen by employing detection beams respectively, and detects a position of a light shielding article on the display screen in correspondence with scanning positions of the detection beams which are light-shielded, the control method comprising:

performing a scanning in a first scanning mode including a grid-shaped scanning operation that is carried out over an entire scanning area of the display screen until the light shielding article is detected; and calculating a moving speed of the light shielding article detected in the grid-shaped scanning operation; and performing a scanning operation including an oblique scanning operation in a second scanning mode when the calculated moving speed is lower than or equal to a first predetermined speed, while limiting a scanning area to a narrower range than the entire scanning area, the narrower range containing a coordinate position detected in the first scanning mode, wherein scanning density including the oblique scanning operation is larger in the second scanning mode than in the first scanning mode, and performing a scanning operation including the oblique scanning operation in a third scanning mode when the calculated moving speed is higher than the first predetermined speed, the third scanning mode under which a total number of light receiving elements for detecting a detection beam emitted from a single light emitting element is smaller than that of the second scanning mode and in which scanning density including the oblique scanning operation is smaller than in the second scanning mode, while limiting a scanning area to a narrower range than the entire scanning area, the narrower range containing a coordinate position detected in the first scanning mode.

4. The control method as claimed in claim 3 wherein:
the scanning operation in the third scanning mode is performed when the calculated moving speed exceeds the first predetermined speed and is lower than or equal to a second predetermined speed, the third scanning mode under which a total number of light receiving elements for detecting a detection beam emitted from a single light emitting element is smaller than that of the second scanning mode and in which scanning density including the oblique scanning operation is smaller than in the second scanning mode, while limiting a scanning area to a narrower range than the entire scanning area which contains a coordinate position detected in the first scanning mode, and wherein the method further comprises performing a scanning operation in a fourth scanning mode for limiting a scanning area to a narrower range than the entire scanning area, the narrower range containing the coordinate position detected in the first scanning mode, so as to perform the grid-shaped scanning operation within the limited scanning area when the calculated moving speed exceeds the second predetermined speed.

5. A coordinate position detecting apparatus, comprising:
a scanning unit configured to scan a scanning area in a first scanning mode, the first scanning mode for performing a scanning operation with detection beams emitted in a first scanning direction;

wherein the scanning unit is configured to scan the scanning area in a second scanning mode, the second scanning mode for performing a scanning operation with the detection beams emitted in a second scanning direction of the detection beams, the second scanning direction being different from the first scanning direction; and wherein the scanning unit is configured to scan an area narrower than the scanning area in a third scanning mode, the third scanning mode for performing a scanning operation with the detection beams emitted in a third scanning direction, the third scanning direction being equal to the first scanning direction;

wherein, when a light shielding article is detected by one of the second scanning mode and the third scanning mode, the first scanning mode and the second scanning mode are operated at a time when a moving speed of the light shielding article is smaller than or equal to a given speed, and the first scanning mode and the third scanning mode are operated at a time when the moving speed is larger than the given speed.

6. The coordinate position detecting apparatus according to claim 5, further comprising: a moving speed detecting unit configured to detect the moving speed of the light shielding article based on a detection result of the first scanning mode.

7. The coordinate position detecting apparatus according to claim 5, wherein the first mode is for performing the scanning operation based on a grid-shaped scanning; and
the second mode is for performing the scanning operation based on an oblique scanning.

* * * * *